Patented Nov. 30, 1948

2,454,837

UNITED STATES PATENT OFFICE 2,454,837

PROCESS OF SOLUBILIZING PROTOGENOUS SUBSTANCES

James A. Reyniers, Niles, Mich., assignor to Amino Acids, Inc., Wilmington, Del., a corporation of Delaware No Drawing. Application May 17, 1946
Serial No. 670,531

2 Claims. (Cl. 99—18)

This invention relates to a process of solubilizing protogenous substances such as edible animal tissues, particularly liver, by subjecting them while suspended in water to carbon dioxide under pressure at temperatures below their coagulation point.

One object of this invention is to produce a lysate, containing factors present in the original protogenous substances, materially unchanged, except in solubility and non-coagulable properties. Such a lysate product serves as a highly assimilable and nutritious food, or food supplement, for infants, convalescents, and malnutrition cases.

A further object of this invention is to provide a method of selectively concentrating the therapeutic and nutritional factors of the original protogenous material.

It is well known in the art that hydrolysis of protogenous substances, to partially or completely soluble degradation products, may be accomplished by employing enzymes, acids, bases or other reagents in the presence or absence of catalysts, but these reactions are accompanied by undesirable side reactions resulting in inferior hydrolysate by-products. Separation of these contaminating reagents generally is difficult.

In contradistinction, the present invention achieves its objective without the undesirable consequences indicated, and as will be seen involves the utilization of carbon dioxide. Comprehensive reaction studies of the effect of carbon dioxide under pressure on liver at low temperatures, near freezing, and at cooking temperatures around 100° C., indicate almost negligible increase in solubility regardless of the length of time the protogenous substance is treated.

For example, samples of macerated liver containing 70 to 90 percent of water were heated in high pressure chambers generally known to the art as bombs to approximately 100° C. for eight (8) and forty (40) hours under 740 pounds of carbon dioxide pressure without resulting in any appreciable increase in solubility due to either the presence of carbon dioxide or to increase of reaction time. In no instance did the increase in solubility over a similarly heated control sample not under $CO_2$ pressure exceed 3.2%. Variations in solubility of samples of liver after heat and $CO_2$ pressure treatment were found to be caused mainly by slight differences in the pH values of the original raw liver.

Likewise, samples of liver subjected at low temperature, 4° C., to high carbon dioxide pressure for forty-eight (48) hours showed less than three percent (3%) increase in solubility over similarly treated controls not under $CO_2$ pressure.

In contrast to these data, increases in solubility over seventeen percent (17%) were obtained at temperatures around 50° C., which is below the coagulation point of liver proteins, and under approximately 600 pounds, $CO_2$ pressure in twenty-four (24) hours. The increase was subsequently stepped up to twenty-seven (27) percent by coagulation at 100° C. in ten (10) minutes after the twenty-four (24) hour pressure treatment.

For those skilled in the art the following detailed description of procedure is given as an example:

Standardization of liver

A quantity of liver was obtained from the same organ and macerated in a blender with 32 cc. of water to each 100 grams. It was then distributed into 10 cc. bottles, sealed in a nitrogen atmosphere, and stored in the freezing compartment of a refrigerator. Thus, each run was made on the same liver and the variation due to different liver samples was eliminated.

Control and pressure bombs

Heavy walled tubes capable of withstanding high internal pressure were used for the bombs. Both the control bombs and $CO_2$ pressure bombs held aliquot samples of standardized liver, consisting of ten (10) grams of macerated liver and 3.2 cc. of water. They were heated in the same oil bath at the same time. Any difference between the control and the $CO_2$ pressure determination was due to the presence of the $CO_2$ under pressure. At 50° C., 600 pounds $CO_2$ pressure was employed. After treatment under these conditions for twenty-four (24) hours, the pressure was relieved from the bomb, and the materials removed through a drain valve. The $CO_2$ may be discharged into the atmosphere or reclaimed if desired.

Assuming the results in the control bomb to be 100 percent unhydrolysed as far as the action of $CO_2$ was concerned, the action of $CO_2$ in the pressure bomb was measured by the following calculations:

$$\frac{A-B}{A} \times 100 = \%CO_2 \text{ hydrolysis}$$

Where:

A = residual solids in control
B = residual solids in $CO_2$ bomb

Both the control and the treated samples of liver were washed six times with a total of 100 cc. of water. The last washing yielding a clear and colorless liquid. The residual insoluble solids were dried and weighed.

The obvious advantages and the advance in the art attributable to this process are manifest in its economic simplicity and the production of a highly nutritious, protogenous material with therapeutic value without the contaminating and undesirable by-products of side reactions or reagents of other protein hydrolyzing methods.

What I claim as my invention is:

1. The hereindescribed process of producing a highly assimilable and nutritious food substance, which comprises: subjecting macerated liver, while suspended in water, to carbon dioxide under approximately 600 pounds per sq. in. pressure at a temperature of approximately 50° C. for twenty or more hours.

2. A process of solubilizing liver comprising subjecting a macerated liver and water mixture to carbon dioxide under approximately 600 pounds per sq. in. pressure in a reaction chamber at approximately 50° C. for twenty (20) or more hours; filtering out and washing the residual insoluble solids; and concentrating, by evaporation, the dissolved protein from the filtrate and washings.

JAMES A. REYNIERS.

REFERENCES CITED

The following references are of record in the file of this patent:

UNITED STATES PATENTS

| Number | Name | Date |
|---|---|---|
| 642,852 | Seebold | Feb. 6, 1900 |
| 1,015,857 | Vasey | Jan. 30, 1912 |
| 1,326,210 | Monhaupt | Dec. 30, 1919 |

FOREIGN PATENTS

| Number | Country | Date |
|---|---|---|
| 7,700 | Great Britain | 1913 |

OTHER REFERENCES

Chemical Abstracts 7:93 (1) Influence of Gases, Oxygen and Carbon Dioxide on Autolysis, v. Autolysis, and Metabolism.

Chemical Abstracts 31: 5396 (1) Partial decomposition of proteins.

Chemical Abstracts 26: 1948 (9) The splitting of proteins by ammonia under pressure.

Chemical Abstracts 18: 3603 (4) Studies of Autolysis.